Patented Oct. 24, 1939

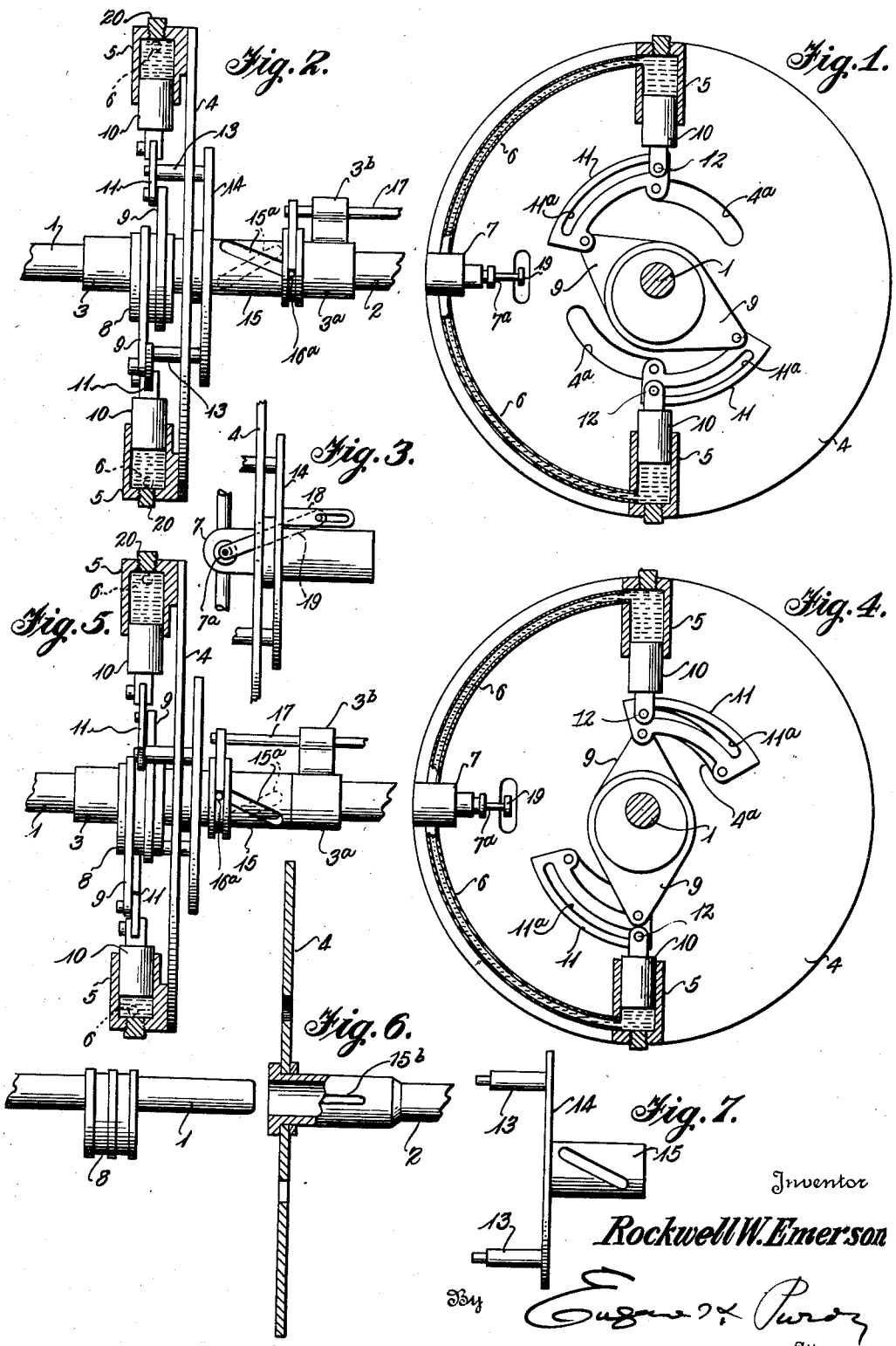

2,177,210

UNITED STATES PATENT OFFICE 2,177,210

HYDRAULIC TRANSMISSION

Rockwell W. Emerson, Lincoln, Nebr.

Application April 21, 1939, Serial No. 269,154

3 Claims. (Cl. 192—60)

This invention relates to hydraulic transmissions capable of use in automobiles, busses, trucks and other kinds of traction machinery, and more particularly to variable speed transmissions of the type in which a fluid is employed for operating a plurality of pistons by which a driven shaft is coupled for rotation to a drive shaft, the speed relationship between the drive and driven shaft being subject to control by the operator.

An object of my invention is to provide an improved form of hydraulic transmission of the above character.

Other objects and advantages will be apparent from the following detailed description of a preferred form of the invention, reference being had to the annexed drawing, in which:

Figure 1 is an end view, in part cross-sectional, of a transmission in neutral position;

Figure 2 is a partly cross-sectional view taken at right angles through the transmission of Fig. 1;

Figure 3 is a detail view of the valve-operating mechanism;

Figure 4 is an end view, in part cross-sectional, of the transmission of Fig. 1 in "full speed" operating position;

Figure 5 is a partly cross-sectional view taken at right angles through the transmission in the position of Fig. 4;

Figure 6 is a detail view showing the manner in which the driven shaft is adapted to be associated with the drive shaft for independent rotation; and Figure 7 is a detail view of the transmission operating plate.

Referring to the mechanism illustrated schematically in the drawing in which a drive shaft 1 operated from an engine or motor is adapted to be coupled to a driven shaft 2 through the transmission of my invention, the drive and driven shafts are supported in fixed bearings 3 and 3a respectively. The end of the driven shaft is adapted to telescope over the end of the drive shaft, as indicated in Fig. 6, so that these shafts may rotate independently of each other. Fixed upon the driven shaft so as to rotate therewith is a fly wheel disk 4 having secured thereto at angularly spaced points adjacent its circumference, cylinders 5 (numbering two in the present embodiment but which may be increased in number if desired) connected by a pipe or conduit 6 skirting the disk 4.

The cylinders and pipe are filled with a fluid, such as oil, and the flow of the fluid between the cylinders is controlled by a valve 7 fastened to the disk 4 and having a stem 7a which by rotation varies the size of an orifice interposed in the pipe 6.

Fixed upon the drive shaft 1 so as to rotate therewith is a cam 8. Encircling the cam and extending outwardly therefrom is a pair of connecting rods 9. Each of the cylinders 5 is provided with a piston 10 reciprocable within the cylinder and in a direction radially with reference to the axis of rotation of the drive shaft 1. A rocking lever 11 is pivoted to the outer end of each connecting rod and this lever is provided with an arcuate slot 11a described from the axis of the drive shaft 1 as a center. Pins 1a carried by the pistons pass through their corresponding slots in the levers.

The outer ends of the levers—that is, the ends of the levers remote from their pivotal connections with the connecting rods 9—are provided with holes which receive the ends of fingers 13 projecting outwardly from one face of a transmission operating plate 14. These fingers pass through clearance openings 4a in the disk 4. The plate 14 is formed integral with a sleeve 15 surrounding the driven shaft and independently rotatable with respect thereto. For rotating the plate 14 through a limited arc with reference to the driven shaft 2, the sleeve is formed with a pair of longitudinally inclined grooves 15a. A collar 16 loosely encircling the sleeve 15 is provided with keys 16a passing through the inclined grooves 15a and receivable within a pair of straight longitudinally-extending grooves 15b on driven shaft 2. The keys impart angular displacement to the sleeve relative to the driven shaft when the collar is moved along the sleeve 15 by means of a control rod 17 slidable through a boss 3b upon fixed bearing 3a and adapted to be operated either by hand or by foot.

In order to actuate the valve 7 through movement of the plate 14 a slotted arm 18 projects from one face of plate 14 and within the slot is received the outer end of a control lever 19 secured to the valve stem 7a and passing through a clearance opening in disk 4. Rotative movement of the plate in either direction causes the control levers to be turned in corresponding directions to vary the valve opening, or to completely open and close such opening.

Plugs 20 are suitably provided in the tops of the cylinders 5 for introducing fluid into the transmission system when necessary. The mechanism described above preferably will be enclosed within a casing (not shown) containing oil for the lubrication of the parts.

The operation of the hydraulic transmission described above is as follows: With the cam 8 occupying the position indicated in Fig. 1, the transmission will be in "neutral"; that is, the drive shaft 1 will rotate without imparting rotation to the driven shaft 2. In this position the pistons 5 are motionless and the valve 7 wide open. The connecting rods at this stage will be angularly offset by about 45 degrees from a line connecting the pistons with the center of rotation of the drive shaft 1 (and cam 8) and hence rotation of the cam will idly rock the levers 11, fastened to the ends of the connecting rods 9, upon the fingers 13.

When the control rod 17 is pushed forward carrying with it the collar 16, the sleeve 15 and transmission operating plate 14 are rotated, causing the fingers 13 to shift the rocking levers 11 in a clockwise direction (considered with reference to Fig. 1) and consequently moving the connecting rods 9 more in line with the pistons 10. The rocking movement of the levers now transmits a reciprocating movement to the pistons, the maximum stroke of the pistons being reached when the connecting rods are in line with the pistons, as illustrated in Fig. 4.

As the plate 14 is rotated the valve 7 will be gradually closed as already described in consonance with such movement. This produces frictional resistance to the flow of fluid between the cylinders 5 through the pipe 6 and to the travel of the pistons within the cylinders. The thrust exerted by the pistons against the fluid within the cylinders tends to lock the fly wheel disk to the cam, causing the latter to turn with the cam, so that when the plate has reached its maximum position of displacement (the "full speed" position) as indicated in Figs. 4 and 5, the fly wheel disk and the cam, and hence the driven shaft and the drive shaft, rotate at the same speed.

When the control rod 17 is pulled rearwardly toward the position shown in Fig. 1, the levers 11 are shifted counterclockwise and the valve 7 is gradually opened to decrease the resistance to the flow of fluid between the cylinders. Hence the speed of the driven shaft is reduced relative to the drive shaft. Complete retraction of the control rod restores the transmission to the condition shown in Figs. 1 and 2.

While I have described and illustrated a hydraulic transmission including two cylinder and piston assemblies, it will be apparent that the number of such cylinders and pistons may be increased if desired. Likewise, more than a single valve to regulate the flow of fluid between the cylinders may be employed if necessary or desirable.

The invention may be embodied in other specific forms without departing from the spirit or essential characteristics of the invention, and the present embodiment is therefore to be considered as illustrative and not restrictive and all changes which come within the meaning and range of equivalency of the claims are therefore intended to be embraced therein.

I claim:

1. A hydraulic, variable speed transmission for operatively coupling a driven shaft to an aligned drive shaft, comprising a plurality of cylinders fixedly supported upon the driven shaft and angularly spaced apart and radially located with reference to the common axis of rotation of said shafts, pistons reciprocable within the cylinders, a conduit providing communication between the cylinders, a fluid filling the cylinders and conduit, a valve for varying the flow of fluid through the conduit, a cam fixed upon the drive shaft, connecting rods freely encircling the cam, a rocking lever extending between each connecting rod and a piston, the connection of the rocking lever with its piston being adjustable along said rocking lever, a fulcrum for each rocking lever, and means for angularly shifting the fulcrums of the rocking levers about the drive shaft so as to move the connecting rods into and out of alignment with the pistons and for simultaneously controlling the valve.

2. A hydraulic variable speed transmission for operatively coupling a driven shaft to an aligned drive shaft, comprising a plurality of cylinders fixedly supported upon the driven shaft and angularly spaced apart and radially located with reference to the common axis of rotation of said shafts, pistons reciprocable within the cylinders, a conduit providing communication between the cylinders, a fluid filling the cylinders and conduit, a valve for varying the flow of fluid through the conduit, a cam fixed upon the drive shaft, connecting rods freely encircling the cam, a rocking lever extending between each connecting rod and a piston, the connection of the rocking lever with its piston being adjustable along said rocking lever, a transmission operating member rotatably adjustable about the driven shaft and providing fulcrums for the rocking levers, and means for angularly shifting the transmission operating member to move the connecting rods into and out of alignment with the pistons and simultaneously controlling the valve.

3. A hydraulic, variable speed transmission for operatively coupling a driven shaft to an aligned drive shaft, comprising a fly wheel disk secured to the driven shaft, a plurality of cylinders fixedly supported radially and in angularly spaced relation upon the fly wheel disk, pistons reciprocable within the cylinders, a conduit providing communication between the cylinders, a fluid filling the cylinders and conduit, a valve upon the fly wheel disk for varying the flow of fluid through the conduit, a cam fixed upon the drive shaft, connecting rods freely encircling the cam, a rocking lever extending between each connecting rod and a piston, said rocking levers each having an arcuate elongated slot therein to provide an adjustable pivotal connection with a piston, a transmission operating plate rotatably adjustable about the driven shaft, fingers projecting laterally from a face of said plate and providing fulcrums for the rocking levers, said fingers passing through slots in the fly wheel disk, a control lever on the valve, an arm on the transmission operating plate adapted to engage and operate said control lever, and means for angularly shifting the transmission operating plate to move the connecting rods into and out of alignment with the pistons and simultaneously controlling the valve.

ROCKWELL W. EMERSON.